(12) United States Patent
Omi (10) Patent No.: US 9,031,302 B2
(45) Date of Patent: May 12, 2015

(54) IMAGE PROCESSING APPARATUS CONFIGURED TO CHANGE A PARAMETER DETERMINED BASED ON USER INPUT SO THAT AN AMPLITUDE RESPONSE OF A PROCESSED IMAGE WITH RESPECT TO AN ORIGINAL IMAGE IS TO BE ZERO OR MORE AND RELATED IMAGE PROCESSING METHOD

(71) Applicant: Canon Kabushiki Kaisha, Tokyo (JP)

(72) Inventor: Hiroyuki Omi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/625,616

(22) Filed: Sep. 24, 2012

(65) Prior Publication Data

US 2013/0077889 A1 Mar. 28, 2013

(30) Foreign Application Priority Data

Sep. 26, 2011 (JP) ................................ 2011-209462

(51) Int. Cl.
*G06K 9/00* (2006.01)
*G06K 9/40* (2006.01)
*G06T 5/00* (2006.01)
*G06K 9/34* (2006.01)

(52) U.S. Cl.
CPC ..... *G06K 9/40* (2013.01); *G06T 5/00* (2013.01)

(58) Field of Classification Search
CPC .................... G06T 2200/28; G06T 2211/00
USPC .......... 382/128–132, 275; 375/229, 230, 316, 375/319, 346; 348/441
See application file for complete search history.

(56) References Cited

U.S. PATENT DOCUMENTS

| 6,327,000 | B1 * | 12/2001 | Auld et al. ................... 348/441 |
| 7,203,229 | B1 * | 4/2007 | Ishida et al. .................. 375/226 |
| 2010/0046672 | A1 * | 2/2010 | Chu et al. ..................... 375/319 |
| 2013/0077889 | A1 * | 3/2013 | Omi ............................. 382/275 |

FOREIGN PATENT DOCUMENTS

JP 3696339 B2 9/2005

* cited by examiner

*Primary Examiner* — Amir Alavi
(74) *Attorney, Agent, or Firm* — Canon U.S.A., Inc. IP Division (57) ABSTRACT

An image processing apparatus includes a processing unit configured to generate a processed image by processing a plurality of band limit signals based on a parameter for adjusting the band limit signal, and a control unit configured to control the parameter so that an amplitude response of the processed image with respect to an original image is to be a predetermined value or more.

16 Claims, 9 Drawing Sheets

IMAGE PROCESSING APPARATUS CONFIGURED TO CHANGE A PARAMETER DETERMINED BASED ON USER INPUT SO THAT AN AMPLITUDE RESPONSE OF A PROCESSED IMAGE WITH RESPECT TO AN ORIGINAL IMAGE IS TO BE ZERO OR MORE AND RELATED IMAGE PROCESSING METHOD

BACKGROUND OF THE INVENTION

1. Field of the Invention

The present invention relates to an image processing apparatus and an image processing method.

2. Description of the Related Art

Conventionally, image processing methods and apparatuses are discussed to improve diagnostic performance in a radiographic image by frequency processing. In the frequency processing, a plurality of band limit images (band limit signals) indicating frequency components of limited frequency bands are generated from an original image before frequency emphasis and every band limit image is emphasized or suppressed. A method for generating a plurality of band limit images includes a method using Laplacian pyramid decomposition, a method using wavelet transformation, a method using an unsharp mask, and the like. If the unsharp mask is used, a band limit image $HL_v$ is expressed with an original image $S_{org}$ and a blurred image $S_{UsLv}$ as the following Expression 1.

[Expression 1]

$$H_{Lv}(x,y) = S_{org}(x,y) - S_{UsLv}(x,y) \quad (1)$$

An index Lv is of a band limit image. Blurred images with different frequency response characteristics are generated, and various band limit images can be obtained. When using an image L at the lowest frequency with band limit, a relation between a band limit image and the original image is expressed as the following Expression 2.

[Expression 2]

$$S_{org}(x,y) = \sum_{Lv=1}^{LvMax} H_{Lv}(x,y) + L(x,y) \quad (2)$$

The decomposed band limit images are added, and the original image is restructured. When using an amplitude response F (HLv) at the frequency of each the band limit images, an amplitude response F of an original image (Sorg) can be expressed as the sum of amplitude responses of the band limit images in Expression 3.

[Expression 3]

$$F(S_{org}org) = \sum_{Lv=1}^{LvMax} F(H_{Lv}) + F(L) \quad (3)$$

Desired frequency response characteristics can be generated by adjusting the amplitude response F for each band limit image.

The frequency processing is described using the following Expression 4 with a band limit image H and an index Lv of the band limit image H. A coefficient $\alpha$ ($\geq 0$) is used for emphasizing the band limit image H. A value $\beta$ ($\geq 0$) is used for adjusting an emphasis degree.

[Expression 4]

$$H'_{Lv}(x,y) = H_{Lv}(x,y) + \beta \times (\alpha_{Lv} - 1) \times H_{Lv}(x,y) \quad (4)$$

In Expression 4, a balance of the basic frequency response characteristics is defined with a value of the emphasis coefficient $\alpha$ for each band limit image, and the degree of effect of the balance is controlled by the emphasis degree $\beta$. When $\beta=1$, a relation between the emphasis coefficient $\alpha$ and the band limit image H is as follows. If $\alpha=1$, the band limit image H is output without any processing. If $\alpha>1$, the band limit image H is emphasized and output. If $\alpha<1$, the band limit image H is suppressed and output.

Japanese Patent No. 3696339 discusses, as a method for adjusting frequency response characteristics, a method for plotting the frequency response characteristics on a graphic user interface (GUI) by a user and obtaining a parameter necessary for frequency emphasis processing from the plotting result.

However, if the frequency characteristics are freely determined, an unexpected artifact can be generated depending on frequency characteristics. For example, with respect to a parameter obtained from a certain frequency characteristics, $\beta \times (\alpha-1) < -1$ is obtained in Expression 4, and a phase of an output image can be inverted and a phase inversion artifact may be generated.

SUMMARY OF THE INVENTION

The present invention is directed to suppression of generation of an artifact.

The present invention is further directed to obtain an operation and an effect that are derived from configurations according to exemplary embodiments of the present invention but are not obtained according to the conventional technique.

According to an aspect of the present invention, an image processing apparatus includes a generation unit configured to generate a plurality of band limit signals from an original image, a processing unit configured to generate a processed image by processing the plurality of the band limit signals based on a parameter for adjusting the band limit signal, and a control unit configured to control the parameter so that an amplitude response of the processed image with respect to the original image is to be a predetermined value or more.

According to another aspect of the present invention, a method for processing an image includes generating a plurality of band limit signals from an original image, generating a processed image by processing the plurality of the band limit signals based on a parameter for adjusting the band limit signal, and controlling the parameter so that an amplitude response of the processed image with respect to the original image is to be a predetermined value or more.

According to the present invention, the generation of the artifact can be suppressed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
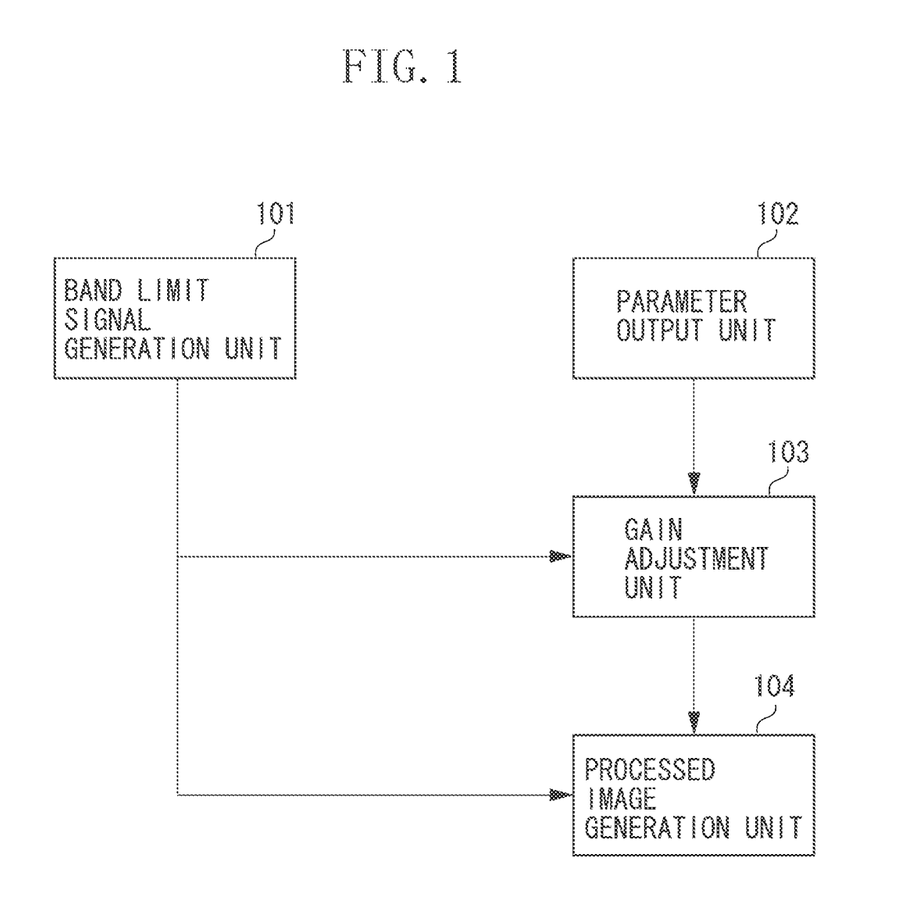
FIG. 1 illustrates an example of a functional configuration of an image processing apparatus.

FIG. 1 illustrates an example of a functional configuration of an X-ray image processing apparatus (image processing apparatus) according to an exemplary embodiment of the present invention. The X-ray image processing apparatus includes, for example, a band limit signal generation unit 101, a parameter output unit 102, a gain adjustment unit 103, and a processed image generation unit 104.

The band limit signal generation unit 101 uses an X-ray image which is obtained by an X-ray sensor and subjected to predetermined pre-processing as an input (original image), and generates and outputs a plurality of band limit signals. A band signal indicates a frequency component of a specific frequency band. In other words, the band limit signal generation unit 101 corresponds to an example of a generation unit configured to generate a plurality of band limit signals from an original image.

The parameter output unit 102 outputs an emphasis coefficient (frequency response characteristics) and an emphasis degree for emphasizing a frequency to be input to the image processing apparatus by a user via an input unit (not illustrated), as emphasis parameters necessary for frequency emphasis processing.

The gain adjustment unit 103 receives the band limit signal and the emphasis parameter necessary for the frequency emphasis processing as inputs, converts the emphasis parameter within predetermined frequency response characteristics, and adjusts the band limit signal with the converted emphasis parameter.

The processed image generation unit 104 receives the band limit signal adjusted by the gain adjustment unit 103 and a low-frequency image signal output from the band limit signal generation unit 101 as inputs, restructures the input signals, and outputs the restructured result. In other words, the gain adjustment unit 103 corresponds to an example of a processing unit configured to generate a processed image by processing a plurality of band limit signals based on a parameter for adjusting the band limit signal. Further, the gain adjustment unit 103 corresponds to an example of a control unit configured to control the parameter so that an amplitude response of a processed image with respect to an original image is a predetermined value or more.

Figure 2:
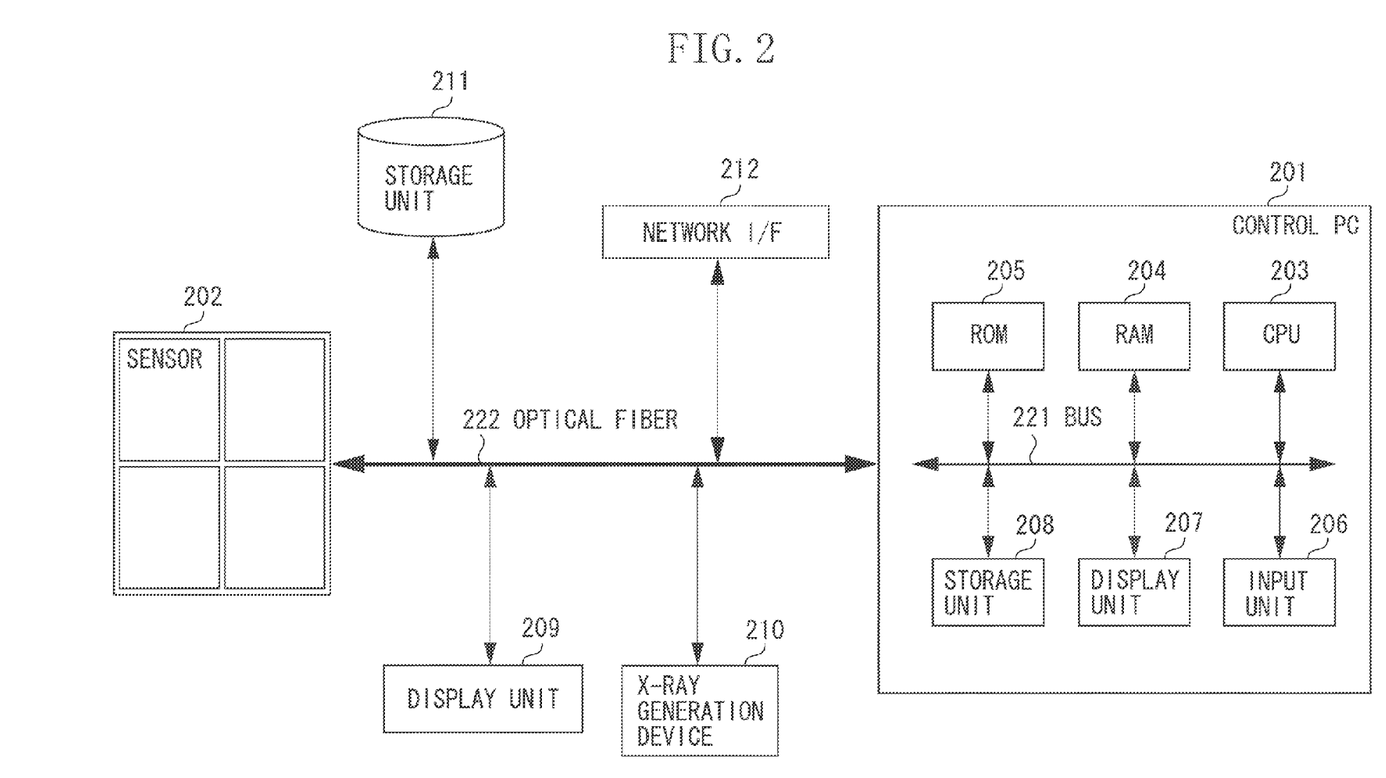
FIG. 2 schematically illustrates an example of a configuration of the image processing apparatus.

FIG. 2 schematically illustrates an example of a configuration of the image processing apparatus. The configuration illustrated in FIG. 1 can be realized with a personal computer (PC) in FIG. 2, for example. A control PC 201, an X-ray sensor 202, a display unit 209, an X-ray generation device 210, a storage unit 211, and a network interface (I/F) 212 are mutually connected via an optical fiber 222. A signal line may not be an optical fiber, and may be a controller area network (CAN) or a Gigabit Ethernet. The control PC 201 includes, for example, a central processing unit (CPU) 203, a random access memory (RAM) 204, a read only memory (ROM) 205, an input unit 206, a display unit 207, a storage unit 208, and a bus 221.

The CPU 203, the RAM 204, the ROM 205, the input unit 206, the display unit 207, and the storage unit 208 are connected to the bus 221. A command is transmitted to the X-ray sensor 202 or the display unit 209 by the control PC 201. In the control PC 201, processing contents for each shooting mode are stored, as software modules, into the storage unit 208, an instruction unit (not illustrated) loads the contents to the RAM 204, and the CPU 203 executes the contents. The components 101 to 104 are stored, as software modules, in the storage unit 208 in the configuration illustrated in FIG. 1. In addition, according to the present exemplary embodiment, the components 101 to 104 in FIG. 1 may be mounted as dedicated image processing boards. An appropriate mounting form may be selected according to purposes.

The details of the X-ray image processing apparatus are described below according to the exemplary embodiment.

Figure 3:
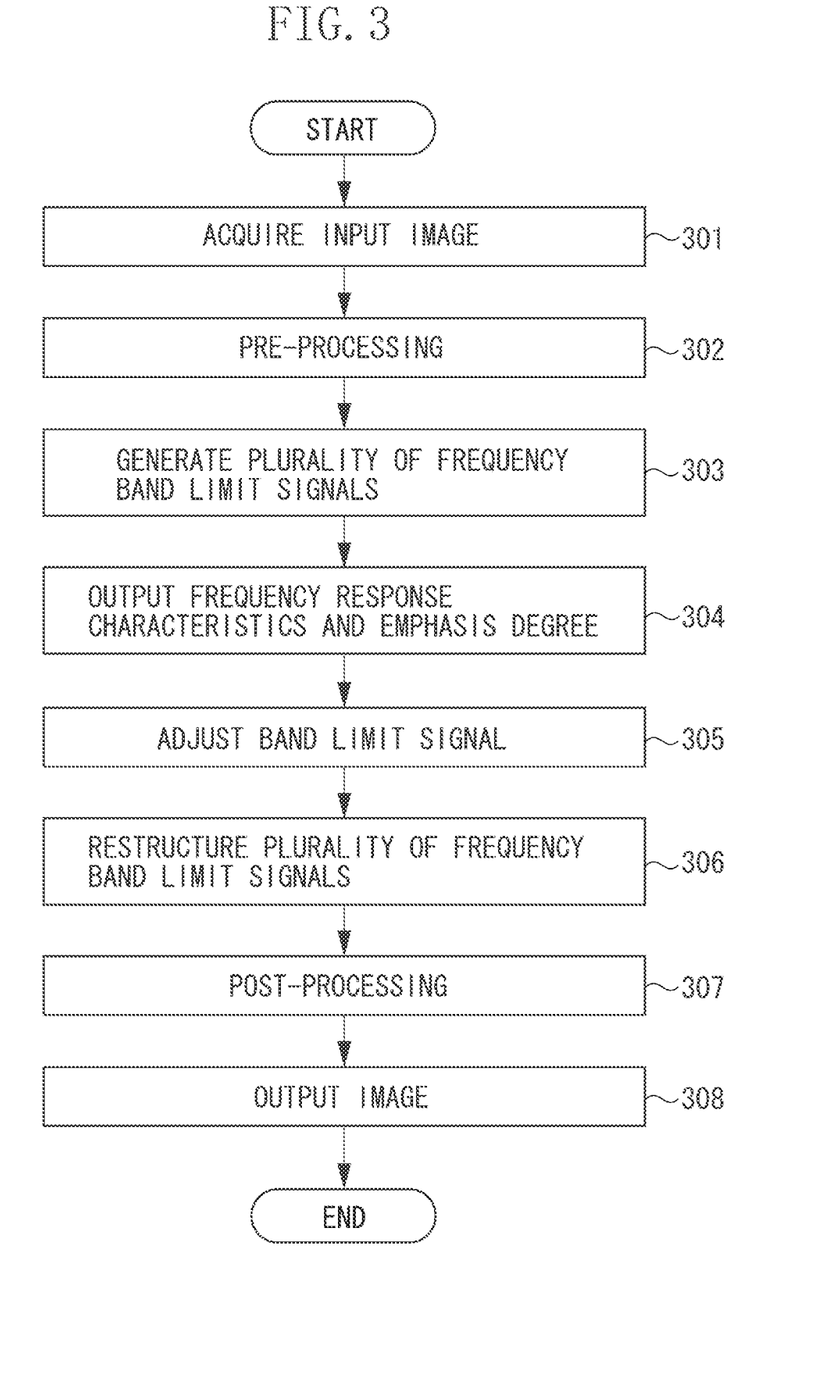
FIG. 3 is a flowchart illustrating an operation of the image processing apparatus.

An operation (image processing method) of the image processing apparatus according to a first exemplary embodiment is described with reference to a flowchart in FIG. 3.

In step 301, the X-ray sensor 202 acquires an X-ray image. In step 302, the X-ray sensor 202 performs pre-processing on the acquired X-ray image. The pre-processing includes, for example, processing for correcting characteristics of the X-ray sensor 202, such as offset correction, Log conversion, gain correction, and defect correction, and grid strip suppression processing for suppressing grid moire. If necessary, processing for improving a signal to noise (S/N) ratio, such as processing for reducing random noise, may be performed.

In step 303, i.e., a generation step, the band limit signal generation unit 101 generates a plurality of frequency band limit signals. As a generation method, a method using Laplacian pyramid decomposition or a method using wavelet transformation is used. Down sampling can limit the number of band limit signals that is validly acquired.

In step 304, the parameter output unit 102 outputs an emphasis coefficient and an emphasis degree. The user designates the emphasis coefficient and the emphasis degree via an instruction unit (not illustrated) such as a keyboard or a mouse. The emphasis coefficient and the emphasis degree correspond to examples of parameters input by the user. The user may directly designate a value of the emphasis coefficient α. As another method, a frequency response characteristic generation tool can be prepared, and the user may designate the emphasis coefficient α using a method for automatically converting the generated characteristics into the emphasis coefficient α without considering the emphasis coefficient α. The emphasis degree has a value β in Expression 1. Similarly to the emphasis coefficient α, the user may directly designate the emphasis degree β or may set the emphasis degree β by automatically converting a value set by another tool.

In step 305, (i.e., a processing step), the gain adjustment unit 103 adjusts the band limit signal using the emphasis coefficient α and the emphasis degree β output from the parameter output unit 102. At this time, the gain adjustment unit 103 checks whether a phase inversion artifact is generated depending on the values of the designated emphasis coefficient α and the emphasis degree β. For example, if the band limit signal is less than zero as the result of adjusting the band limit signal with the emphasis coefficient α and the emphasis degree β output from the parameter output unit 102, the gain adjustment unit 103 determines that the phase inversion artifact is generated. In addition, the gain adjustment unit 103 acquires an amplitude response, and if the acquired amplitude response is less than zero, the gain adjustment unit 103 determines that the phase inversion artifact is generated.

If the phase inversion artifact is generated, the gain adjustment unit 103 limits, for example, the emphasis degree β. The details of a limiting method (a controlling step) of the emphasis degree β is described below.

Figure 4:
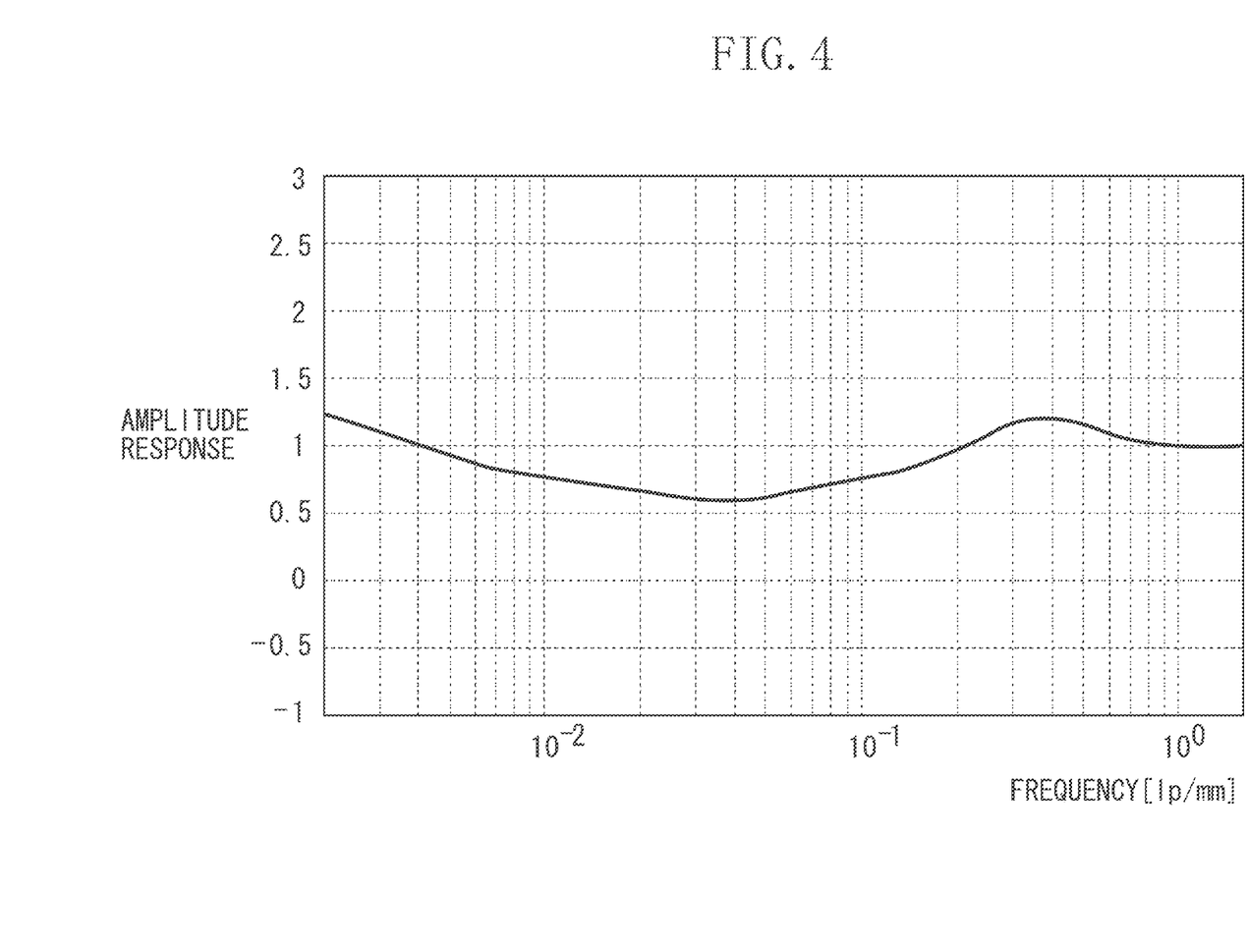
FIG. 4 illustrates an example of frequency characteristics.

According to the present exemplary embodiment, the emphasis coefficient α is generated by another tool, and has frequency response characteristics obtained by mixing effects of the emphasis and the suppression as illustrated in FIG. 4 (if the amplitude response is larger than one, the processed image is emphasized and, if the amplitude response is smaller than one, the processed image is suppressed). When the frequency response characteristics of the amplitude in FIG. 4 is adjusted with the emphasis degree β, the phase inversion artifact is generated if the response is less than zero.

Therefore, at all frequencies, a maximum value of the emphasis degree β needs to be calculated to prevent the frequency at which the amplitude response is less than zero and to limit the emphasis degree β. The amplitude response of a processed image (obtained by processing the original image) of the original image is acquired by adding all results of multiplying the emphasis coefficient α and the emphasis degree β to the amplitude response of each band limit image, as understood from Expressions 3 and 4.

Based on the acquired amplitude response, a value of β×(α−1) for each band can be limited to −1 or more so that the band limit signal is not less than zero. However, only the band limit signal having a value of one is considered and another band limit signal is not considered. Therefore, the emphasis degree β can be excessively limited.

Figure 5:
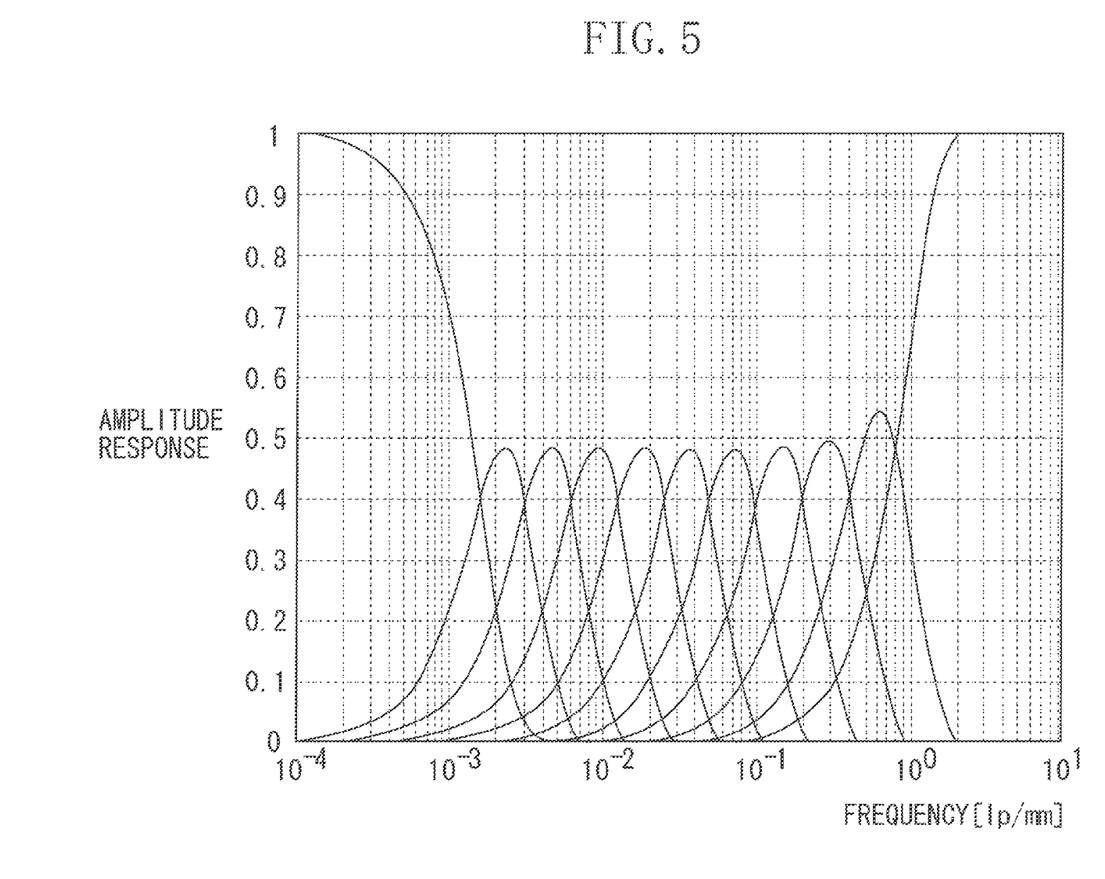
FIG. 5 illustrates an example of characteristics of a band limit image.

FIG. 5 illustrates examples of a plurality of the band limit signals output by the band limit signal generation unit 101. Since a band limit filter for generating the band limit image is not an ideal filter, the band of one band limit image is overlapped to the band (particularly, an adjacent band) of another band limit image, as illustrated in FIG. 5.

Therefore, even if the value of β×(α−1) for each band is −1 or less, when the value of β×(α−1) for the adjacent band is large, the amplitude response of the processed image may not be zero or less. By taking into consideration the influence of all the band limit images, the excessive limitation on the emphasis degree β can be prevented. In other words, the amplitude response according to the present exemplary embodiment is obtained by adding the amplitude response of each band limit signal at a predetermined frequency.

Figure 6:
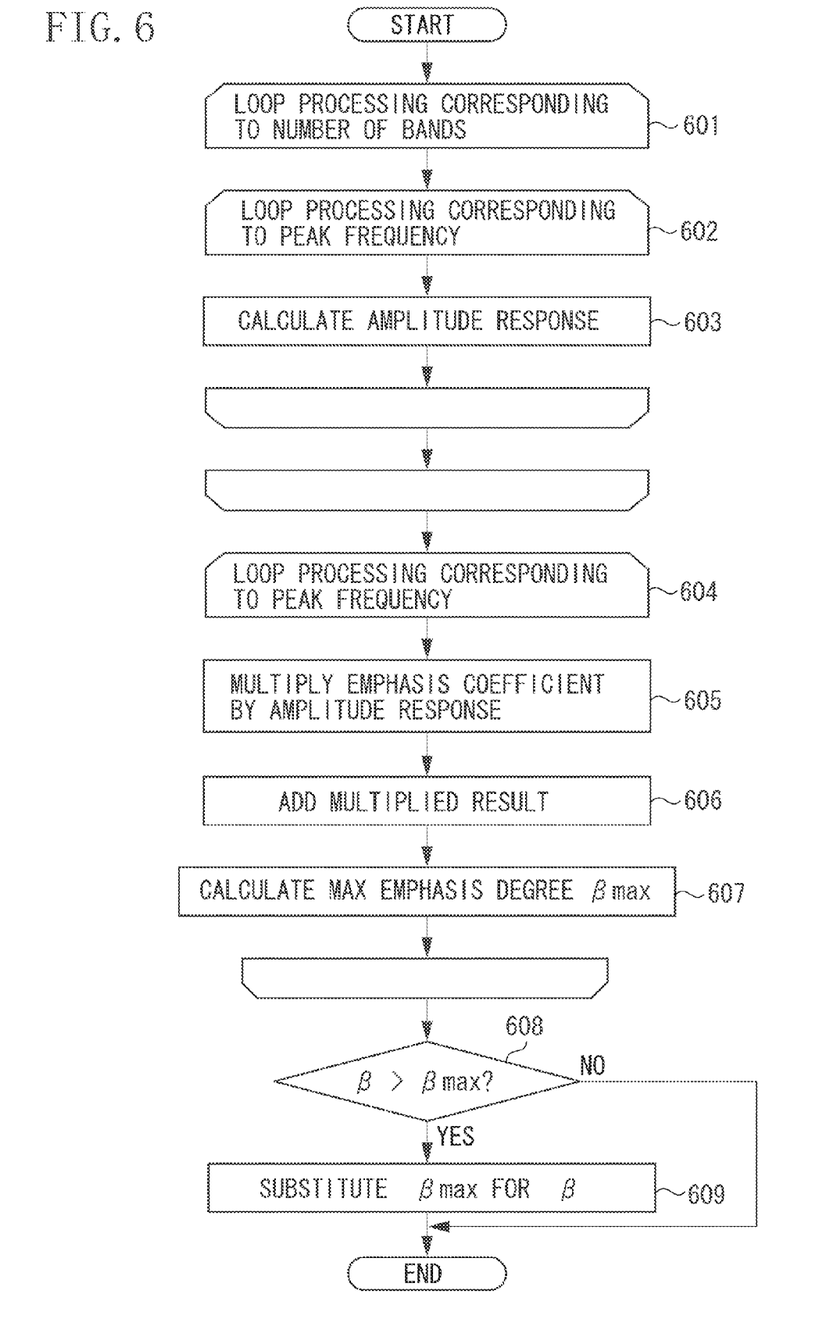
FIG. 6 is a flowchart illustrating an example of a method for limiting an emphasis degree.

FIG. 6 illustrates a method for limiting the emphasis degree β to prevent the generation of the phase inversion artifact.

In steps 601 and 603, the gain adjustment unit 103 calculates the amplitude response characteristics for each limited band. The gain adjustment unit 103 may calculate the amplitude response characteristics corresponding to the number of sampling frequencies. However, the amount of calculation is increased. Thus, in steps 602 and 603, the number of frequencies to be calculated is made smaller than the number of sampled frequencies, the amplitude response is then calculated at only a specific frequency (e.g., a peak frequency), and high-speed processing is realized. The peak frequency is a frequency at which the amplitude response reaches a maximum at each of a plurality of the band limit signals.

As a method for reducing the amount of calculation, the peak frequency of each band limit image is used. The following indicates a relation between the peak frequency and a frequency other than the peak frequency.

For simplifying the relation, it is assumed that there are only two band limit images (e.g., two signals having the same shape, except for different peak frequencies) of an amplitude response R1C and an amplitude response R2C. As an example, the amplitude response R1C is equal to the amplitude response R2C, and the band limit signals thereof are overlapped to each other at the peak frequencies. If β×(α−1) is k1 and k2 for each signal in Expression 4, a total amplitude response R at each of the peak frequencies f1 and f2 (e.g., f1<f2) and a frequency fc (e.g., f1<fc<f2) other than the peak frequency is as described in the following Expression 5.

[Expression 5]

$$R(f1)=k_1 \times R_{1c}(f1)$$

$$R(f2)=k_2 \times R_{2c}(f2)$$

$$R(fc)=k_1 \times R_{1c}(fc)+k_2 \times R_{2c}(fc) \qquad (5)$$

If k1≥0 and k2≥0, in other words, if both of the frequencies are emphasized, all three amplitude responses are zero or more. If k1≥0 and k2<0, the amplitude response R(f2) at the peak frequency has a relation of R(f2)≥0 under the influence of the adjacent band limit signal and the following Expression 6 is established.

[Expression 6]

$$R(fc) \geq 0 \qquad (6)$$

If k2≥0 and k1<0, the result is similar to the foregoing. If k1<0 and k2<0, the amplitude response R(f1) at the peak frequency has a relation of R(f1)≥0 and the amplitude response R(f2) at the peak frequency has a relation of R(f2)≥0 under the influence of another band limit signal. Then, the following Expression 7 is established.

[Expression 7]

$$R(fc) \geq 0 \qquad (7)$$

More specifically, if the amplitude response is constant (depending on the overlap degree of the band limit signals) and the amplitude response at the peak frequency is zero or more, the amplitude response cannot be not less than zero at all frequencies.

The number of sampling is generally 256 to 1024. If the peak frequency is calculated in advance, the number of the amplitude responses may be calculated corresponding to the number of bands. If acquiring the number of amplitude responses from a general medical image size, the number of amplitude responses can be twelve at the most. More specifically, the processing speed can be expected to increase ten times or more.

In steps 601 to 603, the processing for calculating the amplitude response at the peak frequency for each band is performed therefor, and the gain adjustment unit 103 calculates an amplitude response RLv (fi) for each band at a peak frequency fi thereof.

Then, the emphasis degree β is limited. In steps 604 to 607, the gain adjustment unit 103 calculates a maximum emphasis degree βmax which is a threshold or more in the amplitude response of the processed image at the peak frequency for each band. In step 604, the processing in steps 605 to 607 described below is repeated by the number of times corresponding to the number of the peak frequencies.

In step 605, the gain adjustment unit 103 multiplies the emphasis coefficient by the amplitude response at the peak frequency of the band limit signal acquired in step 603. More specifically, the gain adjustment unit 103 multiplies a corresponding coefficient (α−1) to each amplitude response for each band at one peak frequency. In step 606, the gain adjustment unit 103 acquires the amplitude response characteristics of the processed image of the original image at one peak frequency by using the multiplying results. More specifically, the gain adjustment unit 103 acquires the total responses by obtaining the sum of the result of multiplying the emphasis degree β to the multiplying result in step 605 and the amplitude response acquired in step 603. In other words, the gain adjustment unit 103 acquires a value th in the following Expression 8.

Then, in step 607, the gain adjustment unit 103 calculates a maximum emphasis degree βmax so that the amplitude response of the processed image at one peak frequency is the threshold or more. The threshold is set to a value for preventing the phase inversion artifact, that is, the amplitude response is equal to zero. The threshold may be larger than zero, including an operational error of the peak frequency or a margin due to an operational error of the amplitude response. The maximum emphasis degree can be acquired as expressed in the following Expression 8. By repeating the processing in steps 605 to 607 the number of times corresponding to the number of the peak frequencies, the maximum emphasis degree βmax is updated.

[Expression 8]

$$\sum_{Lv=1}^{LvMax} (R_{Lv}(f_i) + \beta_i \times (\alpha_{Lv} - 1) \times R_{Lv}(f_i)) = th = 0 \quad (8)$$

$$\beta_i = -\frac{\sum_{Lv=1}^{LvMax} (R_{Lv}(f_i))}{\sum_{Lv=1}^{LvMax} ((\alpha_{Lv} - 1) \times R_{Lv}(f_i))}$$

$$\beta_{max} = \min_{i=1}^{LvMax} (\beta_i)$$

As expressed in Expression 8, the gain adjustment unit 103 outputs the smallest one of the maximum emphasis degrees at the peak frequency for each band, as the final maximum emphasis degree βmax. In step 608, the gain adjustment unit 103 compares the maximum emphasis degree βmax with the emphasis degree β designated by the user. In step 609, if β>βmax, the gain adjustment unit 103 substitutes the maximum emphasis degree βmax into the emphasis degree β, so that the emphasis degree β is limited to prevent the generation of the phase inversion artifact. More specifically, the gain adjustment unit 103 (control unit) changes the parameter if the amplitude response is less than a predetermined value (e.g., less than zero).

Figure 7:
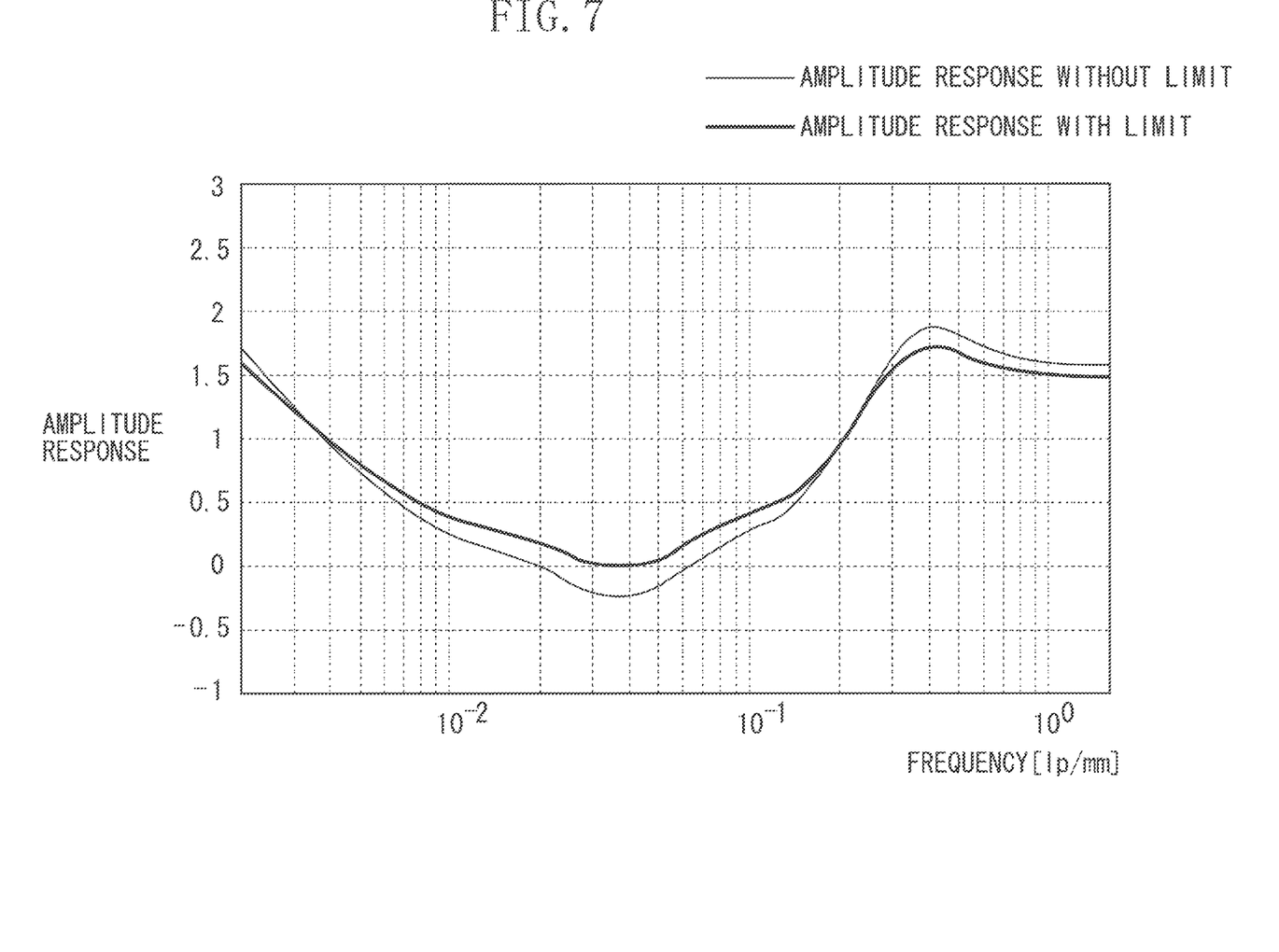
FIG. 7 illustrates an example of suppressed frequency characteristics.

FIG. 7 illustrates the amplitude response characteristics when the emphasis degree is limited and the amplitude response characteristics when the emphasis degree is not limited. As illustrated in FIG. 7, the band is entirely limited and is expressed while desired frequency balance is maintained. By substituting the maximum emphasis degree βmax into the emphasis degree β, the amplitude is limited without breaking the amplitude response characteristics designated by the user.

In other words, the gain adjustment unit 103 (control unit) controls the parameter (e.g., the emphasis degree β) so that the amplitude response is a predetermined value or more at each of a plurality of the band limit signals. More specifically, the gain adjustment unit 103 (control unit) controls the parameter so that the amplitude response will be a predetermined value (e.g., zero) at a specific frequency (e.g., the peak frequency) at each of the plurality of the band limit signals.

In step 306, the processed image generation unit 104 restructures the image using the result of adjusting the band limit image, as expressed in Expression 2. In steps 307 and 308, the processed image generation unit 104 outputs the restructured result as an image subjected to the frequency emphasis, after executing post-processing such as gradation conversion or geometric transformation. The output processed image is displayed on at least one of the display units 207 and 209.

According to the present exemplary embodiment, the emphasis degree may be changed on the GUI. In this case, the image quality is not changed from a certain emphasis degree even by changing the emphasis degree on the GUI. Therefore, information indicating that the emphasis degree is limited and is not changed may be displayed to the user. In this case, the CPU 203 causes the display unit 207 or 209, which displays the GUI, to display the information indicating that the emphasis degree is limited and is not changed. Alternatively, if the emphasis degree is selected but the image quality is not changed therewith, an index of the emphasis degree may be set to unselectable. Alternatively, only an index of a selectable emphasis degree may be displayed. If the emphasis degree is limited, the selectable emphasis degree is fewer than that when the emphasis degree is not limited. Then, the index may be therefore finely displayed.

According to the present exemplary embodiment, the generation of the artifacts can be suppressed.

Further, according to the present exemplary embodiment, the emphasis degree is not limited in consideration of only one band limit signal, but the emphasis degree is limited using the amplitude responses in consideration of a plurality of the band limit signals. Therefore, the emphasis degree can be prevented from being limited more than necessary. In addition, the emphasis degree is limited in consideration of a plurality of the band limit signals. Consequently, the generation of the artifact can be suppressed more certainly.

Further, according to the present exemplary embodiment, the emphasis degree can be limited without breaking the frequency balance of the output image, and thus, there is no risk for breaking the image as the result of limiting the emphasis degree.

Further, according to the present exemplary embodiment, the frequency as a calculation target can be limited to the peak frequency, thus high-speed processing can be realized. Consequently, the processing speed can also be increased in low dose image capturing such as fluoroscopic photographing.

According to the present exemplary embodiment, the frequency to be used in calculation is limited to the peak frequency. However, a frequency near the peak frequency may be used in consideration of the operational error. Although the processing speed is reduced because the amount of calculation of the CPU 203 is increased, the risk for generating the artifact is suppressed corresponding to the increase in amount of calculation.

According to the first exemplary embodiment, in order to speed up the processing, the amplitude response characteristics are not calculated corresponding to the number of samples of the frequencies by the number of the peak frequencies of each bands. According to a second exemplary embodiment of the present invention, the processing speed is further increased.

For example, the number of frequencies to be used for the calculation is determined from the emphasis coefficient α input by the user. As described above according to the first exemplary embodiment, the phase inversion artifact is not generated when the frequency is emphasized. Therefore, the peak frequency of the band limit image having the emphasis coefficient α equal to one or more is excluded from the calculation target, and the amount of calculation is reduced.

For example, with the amplitude response characteristics in FIG. 4, the emphasis coefficient less than one is multiplied to only four band limit images in FIG. 5. Since the number of the band limit images in FIG. 4 is totally eleven, the amount of calculations can be half or less. Since the amplitude response characteristics in FIG. 4 are obtained by combining the emphasis coefficients of respective band limit signals, the number of the band limit signals in FIG. 5 included within a range of less than one of the amplitude characteristics in FIG. 4 is not four.

For the band having the emphasis coefficient less than one, the amount of calculation of the maximum emphasis degree $\beta_i$ is reduced at each peak frequency. FIG. 5 illustrates the amplitude response characteristics of the band limit image. As described above according to the first exemplary embodiment, the band of one band limit image is overlapped to a band (especially, an adjacent band) of another band limit image. For the purpose of accurate calculation, as described above according to the first exemplary embodiment, the amplitude responses of all band limit images need to be added. However, when putting importance on the calculation speed, a large error is not generated if the response of the band limit image having a threshold or less is ignored.

For example, the threshold is determined by a ratio of the amplitude response of other band limit images at the peak frequency of a first band limit image with respect to the amplitude response at the peak frequency of the first band limit image. If the threshold is determined as 20%, consideration is not given to the amplitude response of the band limit image at a ratio of 20% or less of the amplitude response at the peak frequency of the first band limit image with respect to the amplitude response at the peak frequency of the first band limit image. For example, the threshold can be set to a value taking in consideration only two band limit images adjacent to one band limit image. The value of the threshold is determined according to the overlap degree of the band limit signals. For example, the threshold is determined according to the performance of the band limit signal generation unit 101. The value of the threshold and the determination method are not limited to these example. Referring to FIG. 5, if the threshold is set to 20%, the influence of only the adjacent band limit images may be considered.

[Expression 9]

$$\beta_i = -\frac{\sum_{Lv=i-1}^{i+1}(R_{Lv}(f_i))}{\sum_{Lv=i-1}^{i+1}((\alpha_{Lv}-1)\times R_{Lv}(f_i))} \quad (9)$$

Thus, calculation is repeated eleven times for one band limit image if the threshold is not set, but, as expressed in Expression 9, the number of calculation can be reduced to three times. As a consequence, the amount of calculation is one third. With combination of the threshold and the number of calculation times, the processing speed can be further increased.

According to the present exemplary embodiment, the similar effect to that according to the first exemplary embodiment can be obtained. Further, the maximum emphasis degree can be obtained quicker than that according to the first exemplary embodiment.

According to the first exemplary embodiment, the emphasis degrees for all the band limit images are uniquely limited as a method for limiting the emphasis degree in order to prevent the generation of the phase inversion artifact. According to a third exemplary embodiment of the present invention, the emphasis degree is limited for each band limit image. By individually limiting the emphasis degree, images to be generated by changing the emphasis degree are increased and a range of choice for the user can be expanded.

Figure 8:
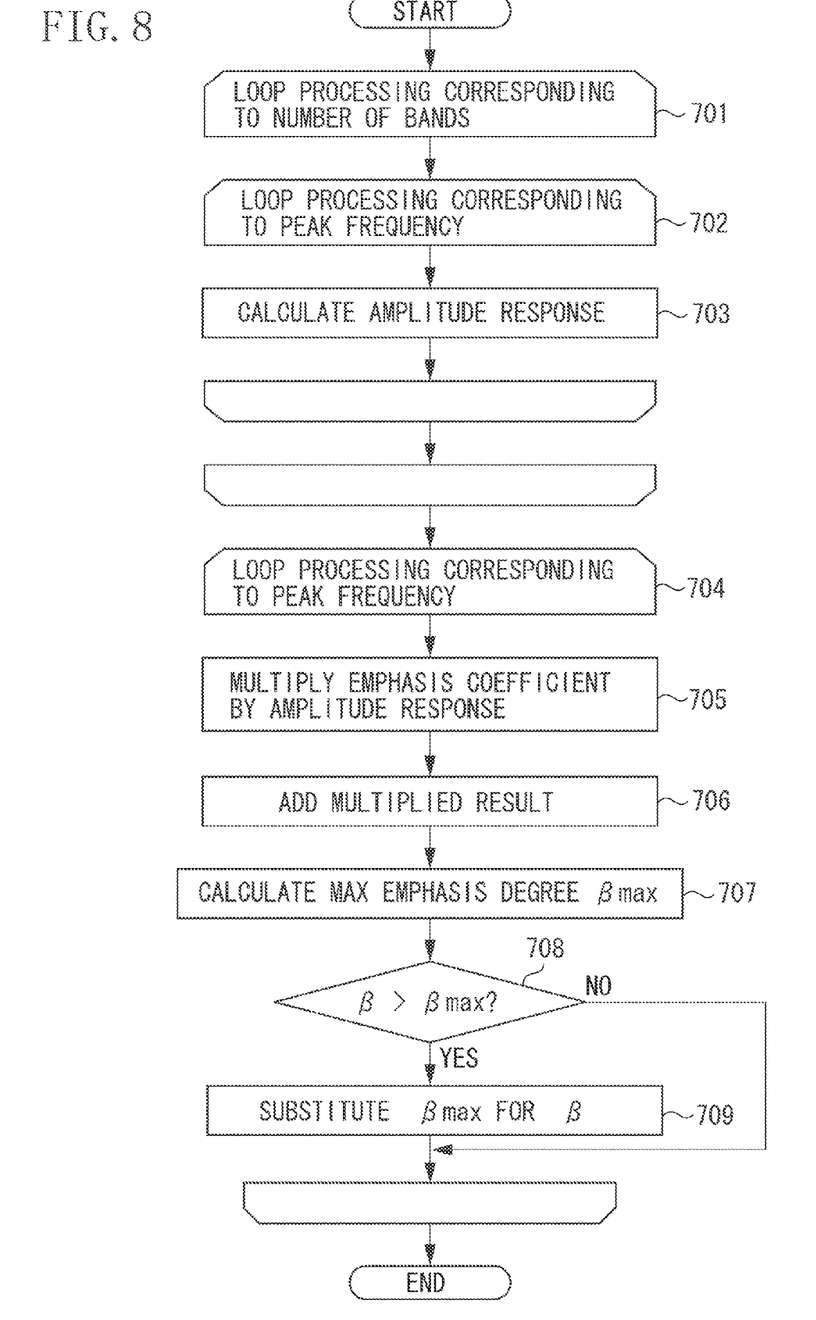
FIG. 8 is a flowchart illustrating another example of the method for limiting the emphasis degree.

FIG. 8 illustrates a method for limiting the emphasis degree to prevent the generation of the phase inversion artifact. Since the processing in steps 701 to 706 is similar to that in steps 601 to 606 in FIG. 6, thus the descriptions thereof are omitted.

In step 707, the maximum emphasis degree βmax that is more than a threshold is calculated for the total frequency response at the peak frequency for each band.

[Expression 10]

$$\sum_{Lv=1}^{LvMax}(R_{Lv}(f_i) + \beta_i \times (\alpha_{Lv}-1)\times R_{Lv}(f_i)) = th = 0 \quad (10)$$

$$\beta\text{Max}_i = -\frac{\sum_{Lv=1}^{LvMax}(R_{Lv}(f_i))}{\sum_{Lv=1}^{LvMax}((\alpha_{Lv}-1)\times R_{Lv}(f_i))}$$

As expressed in Expression 10, the gain adjustment unit 103 acquires the maximum emphasis degree βmaxi for each band (for each peak frequency). Then in step 708, the gain adjustment unit 103 compares the calculation result with a value of an emphasis degree βi designated by the user. If βi>βmaxi (YES in step S708), in step S709, the gain adjustment unit 103 substitutes the maximum emphasis degree βmaxi into the emphasis degree βi, and sets a limit on the emphasis degree β to prevent the generation of the phase inversion artifact.

The emphasis degree β in Expression 4, and the emphasis degree β designated by the user have a single value for all the band limit images. According to the present exemplary embodiment, as the result of limiting the emphasis degree, the emphasis degree varied according to the band is multiplied to the amplitude response.

Figure 9:
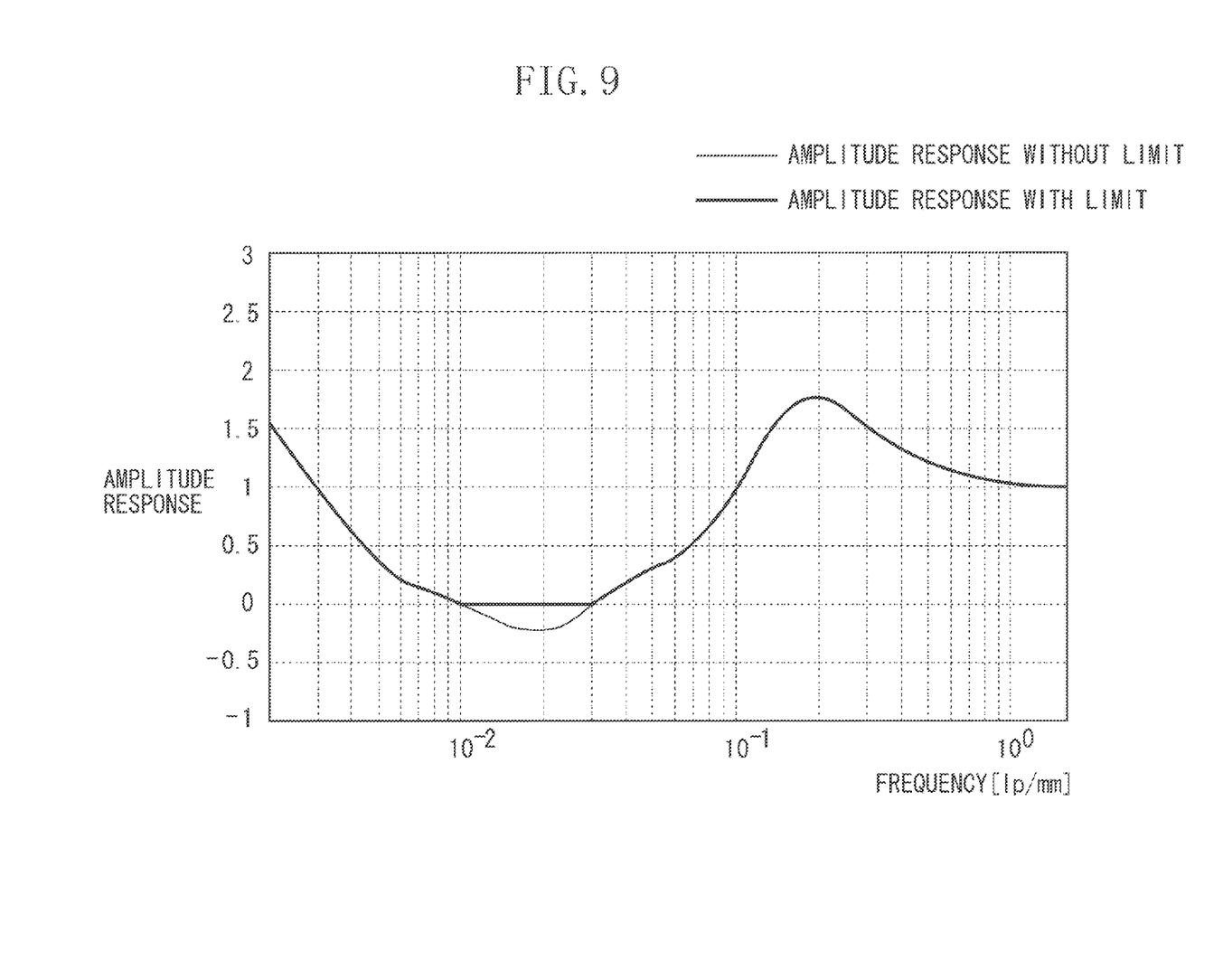
FIG. 9 illustrates another example of the suppressed frequency characteristics.

FIG. 9 illustrates the amplitude response characteristics with the limit and the amplitude response characteristics without the limit. As illustrated in FIG. 9, only a part of the frequency band is limited and another band is expressed with a desired emphasis degree.

According to the present exemplary embodiment, the emphasis degree may be changed on the GUI. In this case, if the emphasis degree is changed on the GUI within a range of a certain emphasis degree, the frequency balance of the image quality is changed. On the other hand, if the emphasis degree is changed on the GUI within a range of the maximum emphasis degree or more, the frequency balance of the image quality is not changed. Thus, the emphasis degree with the limit may be indicated by changing the color or design of an area of the GUI indicating the limited emphasis degree or more.

The GUI similar to that according to the first exemplary embodiment may be used.

According to the present exemplary embodiment, the similar effect to that according to the first exemplary embodiment can be obtained. Further, since the maximum emphasis degree is calculated for each band limit image, the number of images to be generated by changing the emphasis degree is increased and the option for the user can be expanded.

According to the first to third exemplary embodiments, the emphasis degree β output by the parameter output unit 102 is controlled. According to a fourth exemplary embodiment of the present invention, a frequency response characteristic α is controlled. As expressed in the following Expression 11, a coefficient c is multiplied to the frequency response characteristics α, thus the control is performed.

[Expression 11]

$$H'_{Lv}(x,y) = H_{Lv}(x,y) + \beta \times (c \times \alpha_{Lv} - 1) \times H_{Lv}(x,y) \quad (11)$$

In the case of using the value of the emphasis coefficient α and the value of the emphasis degree β output from the parameter output unit 102, the gain adjustment unit 103 checks whether the phase inversion artifact is generated. If the phase inversion artifact is generated, the frequency balance is limited. As a response illustrated by a thin line in FIG. 7, the phase inversion artifact is generated when the amplitude response is a value less than zero. Therefore, as a response illustrated by a bold line in FIG. 7, for all frequencies, the frequency balance needs to be limited to frequencies which do not include the amplitude response characteristics of less than zero.

The gain adjustment unit 103 calculates a coefficient cmax for multiplying to prevent a condition that the amplitude response characteristics of the processed image with respect to the original image are not less than zero at the peak frequency for each band. Alternatively, the amplitude response characteristics may be zero or more, including the margin due to the operational error of the peak frequency or the operational error of the amplitude response.

[Expression 12]

$$\sum_{Lv=1}^{LvMax} (R_{Lv}(f_i) + c_i \times (\alpha_{Lv} - 1) \times R_{Lv}(f_i)) = th = 0 \quad (12)$$

$$c_i = -\frac{\sum_{Lv=1}^{LvMax} (R_{Lv}(f_i))}{\sum_{Lv=1}^{LvMax} ((\alpha_{Lv} - 1) \times R_{Lv}(f_i))}$$

$$c_{max} = \min_{i=1}^{LvMax} (c_i)$$

As expressed in Expression 12, the gain adjustment unit 103 calculates the smallest value cmax in the coefficients c of the peak frequency for each band, as a value c in Expression 12. More specifically, when the coefficient c is multiplied, the amplitude response of the processed image with respect to the original image is maintained to zero or more. Therefore, a value obtained by multiplying the coefficient c by the input emphasis coefficient α is set as the limited frequency response characteristics. Although the emphasis effect is weaker than desired response characteristics, the emphasis balance of the frequency is maintained. Therefore, the risk for breaking the image is low. As described above according to the third exemplary embodiment, the coefficient c may be acquired for each band.

According to the present exemplary embodiment, the similar effect to that according to the first exemplary embodiment can be obtained.

Aspects of the present invention can also be realized by a computer of a system or apparatus (or devices such as a CPU or a micro-processing unit (MPU) which may also be referred to as a microprocessor) that reads out and executes a program recorded on a memory device to perform the functions of one or more of the above-described embodiments, and by a method, the steps of which are performed by a computer of a system or apparatus by, for example, reading out and executing a program recorded on a memory device to perform the functions one or more of the above-described embodiments. The program can be provided to the computer for example via a network or from a recording medium of various types serving as the memory device (e.g., non-transitory computer-readable medium). The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-209462 filed Sep. 26, 2011, which is hereby incorporated by reference herein in its entirety.

What is claimed is:

1. An image processing apparatus comprising:
   a generation unit configured to generate a plurality of band limit signals from an original image which is obtained based on an output from an X-ray sensor;
   a processing unit configured to generate a processed image by processing the plurality of the band limit signals based on a parameter for adjusting the band limit signal; and
   a control unit configured to change the parameter which is determined based on an input from a user so that an amplitude response of the processed image with respect to the original image is to be zero or more.

2. The image processing apparatus according to claim 1, wherein the control unit controls the parameter so that the amplitude response is to be the predetermined value or more for each of the plurality of the band limit signals.

3. The image processing apparatus according to claim 2, wherein the control unit controls the parameter so that the amplitude response is to be the predetermined value or more at a specific frequency for each of the plurality of the band limit signals.

4. The image processing apparatus according to claim 3, wherein the specific frequency is a peak frequency at which the amplitude response is maximum for each of the plurality of the band limit signals.

5. The image processing apparatus according to claim 1, wherein the control unit changes the parameter if the amplitude response is less than the predetermined value.

6. The image processing apparatus according to claim 1, wherein the control unit controls the parameter so that amplitude response is to be zero or more.

7. The image processing apparatus according to claim 1, wherein the amplitude response is obtained by adding the amplitude response of each band limit signal at a predetermined frequency.

8. The image processing apparatus according to claim 1, wherein the parameter is input by a user.

9. The image processing apparatus according to claim 1, wherein the original image is an X-ray image.

10. A method for processing an image, the method comprising:
   generating a plurality of band limit signals from an original image which is obtained based on an output from an X-ray sensor;
   generating a processed image by processing the plurality of the band limit signals based on a parameter for adjusting the band limit signal; and
   changing the parameter which is determined based on an input from a user so that an amplitude response of the processed image with respect to the original image is to be zero or more.

11. An image processing apparatus comprising:
   a generation unit configured to generate a plurality of band limit signals from an original image which is obtained based on an output from an X-ray sensor; and
   a processing unit configured to generate a processed image by processing the plurality of band limit signals based on a parameter which is limited so that an amplitude response of the processed image with respect to the original image is to be zero or more.

12. A method of image processing, the method comprising:
   generating a plurality of band limit signals from an original image which is obtained based on an output from an X-ray sensor; and
   generating a processed image by processing the plurality of band limit signals based on a parameter which is limited so that an amplitude response of the processed image with respect to the original image is to be zero or more.

13. A computer-readable non-transitory medium that stores a program of instructions capable of causing a computer to perform a method of image processing, the method comprising:
   generating a plurality of band limit signals from an original image which is obtained based on an output from an X-ray sensor; and
   generating a processed image by processing the plurality of band limit signals based on a parameter which is limited so that an amplitude response of the processed image with respect to the original image is to be zero or more.

14. An image processing apparatus comprising:
   an acquisition unit configured to acquire an original image which is obtained based on an output from an X-ray sensor; and
   a processing unit configured to generate a processed image by processing the original image based on a parameter which is limited so that an amplitude response of the processed image with respect to the original image is to be zero or more.

15. A method of image processing, the method comprising:
   acquiring an original image which is obtained based on an output from an X-ray sensor; and
   generating a processed image by processing the original image based on a parameter which is limited so that an amplitude response of the processed image with respect to the original image is to be zero or more.

16. A computer-readable non-transitory medium that stores a program of instructions capable of causing a computer to perform a method of image processing, the method comprising:
   acquiring an original image which is obtained based on an output from an X-ray sensor; and
   generating a processed image by processing the original image based on a parameter which is limited so that an amplitude response of the processed image with respect to the original image is to be zero or more.

* * * * *